United States Patent [19]

Wieme

[11] 4,278,726
[45] Jul. 14, 1981

[54] ENERGY ABSORBING ELEMENTS COMPRISING RIGID NON-ELASTOMERIC LAYER AND VISCO-ELASTIC LAYER WITH TWISTED FIBER BUNDLES EMBEDDED THEREIN

[75] Inventor: Andre Wieme, Zwevegem, Belgium

[73] Assignee: N. V. Bekaert S.A., Zwevegem, Belgium

[21] Appl. No.: 78,057

[22] Filed: Sep. 24, 1979

[30] Foreign Application Priority Data

Sep. 28, 1978 [LU] Luxembourg ............................ 80296

[51] Int. Cl.³ .......................... F16C 27/06; F16F 1/40; F16F 7/12; F16F 11/00
[52] U.S. Cl. ..................................... 428/229; 248/560; 248/636; 248/638; 267/140.3; 267/140.4; 267/141.1; 267/141.2; 267/152; 267/153; 428/246; 428/250; 428/251; 428/252; 428/292; 428/295; 428/297; 428/302; 428/902
[58] Field of Search ..................... 267/153, 152, 140.3, 267/140.4, 141.1, 141.2; 428/295, 292, 229, 246, 250, 251, 252, 297, 302, 902; 248/560, 636, 638

[56] References Cited

U.S. PATENT DOCUMENTS

| 2,184,432 | 2/1963 | Austin et al. | 267/153 |
| 2,698,032 | 12/1954 | Bacon | 428/295 |
| 2,819,994 | 1/1958 | Gregory | 428/292 |
| 3,075,624 | 1/1963 | Fawick | 267/152 |
| 3,079,277 | 2/1963 | Painter | 267/153 |
| 3,459,400 | 8/1969 | Rothermel | 248/636 |
| 3,477,674 | 11/1969 | Schaller | 267/153 |
| 3,522,139 | 7/1970 | Redmond | 428/295 |
| 3,865,677 | 2/1975 | Margocchi et al. | 428/295 |
| 4,006,892 | 2/1977 | Koenemon | 267/153 |
| 4,050,659 | 9/1977 | Cannoa | 248/636 |
| 4,127,039 | 11/1978 | Hollaway | 428/295 |

FOREIGN PATENT DOCUMENTS 952861 5/1949 France .
873305 7/1961 United Kingdom .

Primary Examiner—James C. Cannon
Attorney, Agent, or Firm—Edward J. Brenner

[57] ABSTRACT

An energy absorbing element such as a spring, shock absorber or vibration damper in the form of a laminated structure comprising at least one rigid non-elastomeric layer such as a reinforced plastic material bonded to a visco-elastic layer such as a vulcanizable elastomer in which twisted fiber bundles are embedded in the visco-elastic layer. Preferably the twisted fiber bundle comprises a steel cord having an elongation at rupture between 1.5 and 8%. An anchoring layer between the visco-elastic layer and the non-elastomeric layer may be employed.

6 Claims, 3 Drawing Figures

ENERGY ABSORBING ELEMENTS COMPRISING RIGID NON-ELASTOMERIC LAYER AND VISCO-ELASTIC LAYER WITH TWISTED FIBER BUNDLES EMBEDDED THEREIN

BACKGROUND OF THE INVENTION

The present invention relates to elements with laminate structure absorbing mechanical energy such as springs, shock absorbers or vibration dampers and having the form of plates, sheets, strips, rods, tubes or profiles.

It is widely known to use composite materials (e.g., glass fibre reinforced plastics) or multilayer objects for springs or vibration dampers.

SUMMARY OF THE INVENTION

It is now an object of the present invention to provide new laminate structures with energy absorbing capacities unknown before and largely exceeding those of conventional solid energy absorbing structures. According to the invention it has been found that the energy absorbing capacity in non-elastomeric elements is raised surprisingly by bonding the latter to at least one layer of fibre-reinforced visco-elastic material.

The non-elastomeric elements in this structure may generally contain metal, wood, glass, concrete, ceramics, or plastic materials, all of them possibly reinforced.

The visco-elastic layer may contain elastomeric materials and/or flexible thermo-plastic materials. The absorption of mechanical vibrations is partly achieved by the self-absorption of the visco-elastic material and partly by the friction and the deformation of the fibres incorporated in said layer. The visco-elastic layer shall preferably have a good flexibility and a high absorbing capacity at a wide range of temperatures, e.g. from $-40°$ C. up to $+120°$ C. It shall also display good adhesion to the embedded fibres. Moreover, the incorporation of fibres with high tensile strengths (tensile strength $\geq 2000$ N/mm$^2$) and high moduli of elasticity ($\geq 7.10^6$ N/mm$^2$) will raise the mechanical resistance and the rigidity of the structure. Therefore, the fibres that are suitable are glass, carbon, boron, polyamides, polyaramides, polyester and/or metal fibres. Fibres with different compositions can be incorporated. They may be in the form of short fibres or continuous filaments, eventually crimped, and either in bundle arrangement, so as for example wire bundles, strands, cords, cables, or in the form of separate fibres; however twisted fiber bundles with substantial length or continuous are preferred. Furthermore, the fibres can be incorporated (embedded) in a visco-elastic layer in woven, multilayer, isotrope or anisotrope fashion. The orientation of the fibres in the layer may be unidirectional so that for example they are alternately tensile and axially compression loaded with the frequency of the vibration to be absorbed. The fibres can also be so oriented that at least some of them are cyclically torsion and/or shear loaded with the frequency of the vibration to be absorbed.

The laminate structure according to the invention may comprise one or more layers of the non-elastomeric material bonded to one or more layers of the fibre reinforced visco-elastic material: for example a sandwich structure or a structure with alternating non-elastomeric and visco-elastic materials. The non-elastomeric layer may be coated with the visco-elastic layer over its (or their) entire surface or only over a part thereof. In the extreme case, the visco-elastic layer may comprise only one filament or strand of fibres covered (or sheathed) with a more or less concentric layer of visco-elastic material and having at each side of the filament or strand a minimum thickness of the same order of magnitude as that of said filament, respectively strand.

It has particularly been established that one layer of rubber comprising metal wires (for example steel wires and steel cords or strands) and bonded to rigid plates or strips, offers them an excellent energy absorption capacity when the vibration amplitude is perpendicular to the direction of the metal wires.

The invention particularly relates to a laminate in the form of a plate or strip and comprising a central rigid layer of a thermohardening resin reinforced with glass fibres and covered at both sides with elastomer material in which unidirectional parallel steel wire strands are embedded. In the case of a strip, the twisted steel wire strands are oriented in the longitudinal direction thereof. This structure is applicable as a single leaf spring under bending load perpendicular to the layer contacting surfaces in the strip and possesses an absorbing capacity much higher than that of the leaf springs currently used. Moreover, this spring is much lighter than the conventional steel leaf springs.

It has been found that it is often preferable to insert an anchoring layer between the non-elastomeric material and the visco-elastic material. Such anchoring layers may for example be a glass fibre fabric, one of its sides being embedded in the elastomer material and the other side in the thermodurable resin surface of the non-elastomeric layer during manufacture of the laminate.

BRIEF DESCRIPTION OF THE DRAWINGS

An embodiment of the invention will now be described for illustration whereby reference is made to the attached drawings. Its absorbing capacity is compared with that of a conventional damping structure.

DESCRIPTION OF THE PREFERRED EMBODIMENTS

Figure 1:
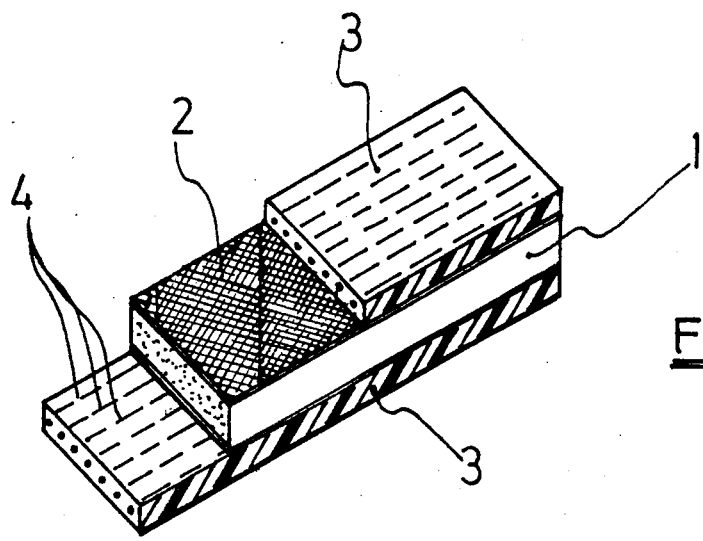
FIG. 1 is a view of a laminate (in sandwich fashion) in the form of a strip according to the invention.

The strip-shaped laminate structure shown in FIG. 1 comprises a core layer 1 of rigid material (for example an epoxy resin axially reinforced with glass fibres). This layer 1 is covered at both sides with anchoring layers 2 which may be glass fibre fabrics in which the warp and weft wires form an angle of approximately 45° to the longitudinal axis of the strip. These anchoring layers 2 are part of the visco-elastic layers 3. The twisted fibre bundles 4—for example steel cord—embedded in the layers 3 may also be oriented in the longitudinal direction of the strip.

Figure 2:
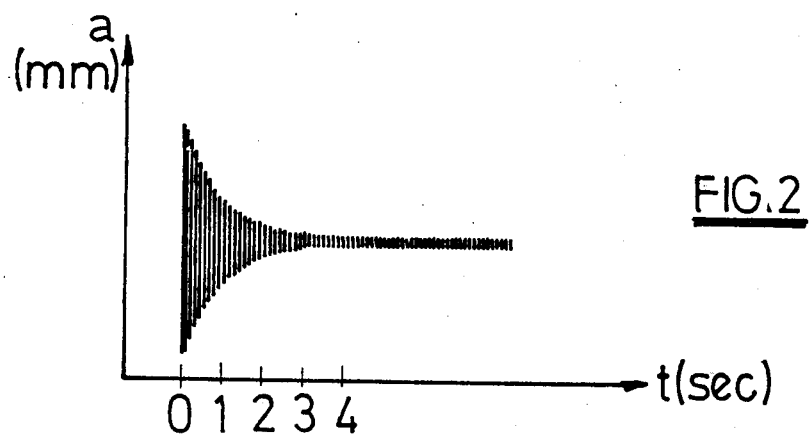
FIG. 2 is an absorption diagramme of mechanical vibrations of a known energy absorbing composite structure.
Figure 3:
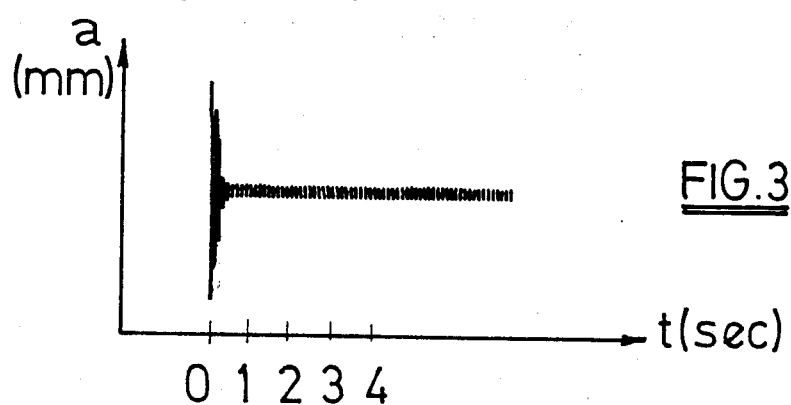
FIG. 3 is an analogous diagramme of a laminate according to the invention and having the same dimensions.

The absorption diagrammes of the vibration according to the FIGS. 2 and 3 are recorded by means of an oscilloscope and show in the abscissa the absorption time and in the ordinate the amplitude of the vibrations. The strip-formed laminate structures had the same dimensions and were subjected to bending tests in which one end of the strip was fixed in a clamp whereas the other end situated 200 mm away from the clamping point was submitted to a bending force of 143 N.mm perpendicularly to the laminate surface. The width of the strip was 20 mm and its thickness 8 mm.

The tested strip relating to the diagramme in FIG. 2 comprised a core layer 1 composed of epoxy resin reinforced with glass fibre and having a density of 1.64 g/cm$^3$, a Young's modulus of 20.800 N/mm$^2$, and a thickness of 5 mm. Both visco-elastic layers 3 were vulcanized rubber strips with a thickness of 1.5 mm. The time interval to absorb the vibration to a zero amplitude reached about 4.11 seconds.

The diagramme in FIG. 3 relates to a structure according to the invention. The structure comprised a core layer 1 of the same composition and the same thickness (5 mm) as that in FIG. 2. Yet this core layer was covered at both sides with rubber strips 3 with a thickness of 1.5 mm and comprised a series of conventional brass coated steel strands 4 of the 0.30 mm+6×0.25 mm construction (high-carbon steel core wire with a diameter of 0.30 mm around which six wires with a diameter of 0.25 mm are twisted). The strands were oriented in the longitudinal direction of the strip and with a density of 20 strands per cm width of the strip. They presented an elongation at rupture of about 2%. As shown in the FIG. 3 the time interval to absorb the vibration is extremely short: 0.275 seconds.

It is believed that the twist of the fiber bundle, particularly in the cord increases its damping capacity. The incorporation of fiber bundles e.g. steel cords with a high elongation capacity (5 to 10% elongation at rupture) can be favourable for particular applications. Further next to an excellent chemical bond of rubber to brass coated or zinc coated steel cord, the mechanical anchorage of rubber between the steel wires in the cords is believed to improve the damping performance. Hence the use of steel cords allowing a good penetration of rubber between the twisted wires is advantageous. The presence of steel filaments in rubber also favours the dissipation of heat build up in the elastomer during vibration. Indeed by damping mechanical vibrations, mechanical energy is transformed into heat.

A good dissipation of heat is important in view of retarding the degeneration of the rubber quality and of its bond to the steel filaments in the cords, particularly when the structure is continuously or for long periods submitted to vibration forces or cycling mechanical loads (bending, torsion, shear etc.). To utilize better the damping effect due to shear transformation in the elastomer it can be advantageous to cover a structure as shown in FIG. 1 on the upper and/or underside with a stiff plate bonded to the elastomer layers(s). When this plate is metal, it further favours the stiffness and heat dissipation in the elastomeric layers.

The invention also relates to applications of laminated structures with a high absorption capacity such as supporting beams for bridges, leaf springs for vehicles, various kinds of dampers, torsion bars, etc.

I claim:

1. An energy absorbing element such as a spring, shock absorber or vibration damper in the form of a laminated structure comprising at least one rigid non-elastomeric layer bonded to a visco-elastic layer, wherein twisted fibre bundles are embedded in said visco-elastic layer.

2. An element according to claim 1 wherein the visco-elastic material is a vulcanizable elastomer.

3. An element according to claim 1 wherein the visco-elastic material comprises at least one twisted fibre bundle with an elongation at rupture of not more than about 10%.

4. An element according to claim 3 wherein the twisted fibre bundle is steel cord with an elongation at rupture between about 1.5% and 8%.

5. An element according to claim 3 wherein the non-elastomeric layer is a reinforced plastic material.

6. An element according to claim 5 including an anchoring layer between the visco-elastic layer and the non-elastomeric layer.

* * * * *